Figure 1:
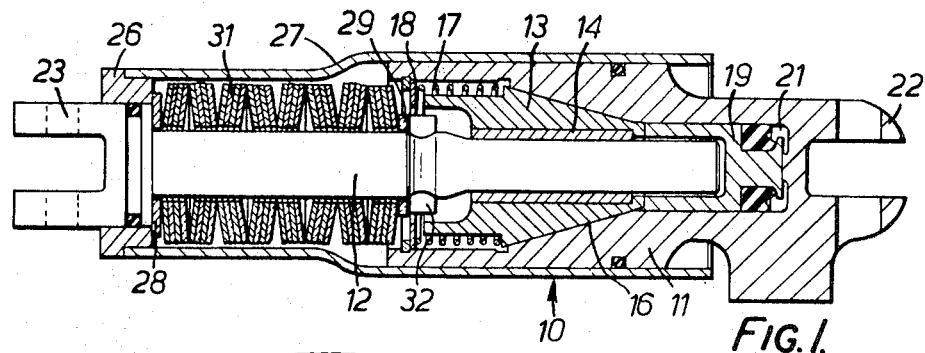

United States Patent

[11] 3,613,841

[72] Inventor Charles Newstead
Tyseley, England
[21] Appl. No. 27,873
[22] Filed Apr. 13, 1970
[45] Patented Oct. 19, 1971
[73] Assignee Girling Limited
[32] Priority Apr. 11, 1969
[33] Great Britain
[31] 18,764/69

[54] LOCKING MEANS FOR VEHICLE WHEEL BRAKES
6 Claims, 5 Drawing Figs.

[52] U.S. Cl. .................................................. 188/265, 192/114, 303/89
[51] Int. Cl. .................................................. F16d 51/00
[50] Field of Search .......................................... 188/265; 192/114; 92/17; 303/89

[56] References Cited
UNITED STATES PATENTS

| | | | |
|---|---|---|---|
| 3,203,513 | 8/1965 | Allen .......................... | 303/89 X |
| 3,205,020 | 9/1965 | Schubert ..................... | 303/89 X |
| 3,384,205 | 5/1968 | Chouings ..................... | 188/364 X |

Primary Examiner—George E. A. Halvosa
Attorney—Scrivener, Parker, Scrivener and Clarke ABSTRACT: A drum brake of the type having carriers which transmit thrust from a wheel cylinder to the brake shoes is provided with a locking unit comprising a telescopic strut connected between the carrier and lockable in an extended condition to prevent shoe retraction. Overloading of the strut is prevented by a resilient overload device acting in series with the strut, and a pivoted lever operated by the wheel cylinder makes it possible to relieve the locked strut of the load transmitted by the overload device, thereby facilitating unlocking of the strut.

LOCKING MEANS FOR VEHICLE WHEEL BRAKES

This invention relates to vehicle wheel brakes incorporating automatic locking means effective to hold the brakeshoes or other friction members in braking engagement with a drum or other brake rotor.

The complete specification of our copending patent application Ser. No. 873,316 filed Nov. 3, 1969 describes and claims a vehicle wheel brake comprising a fixed structure, a friction element movably mounted on the fixed structure for movement into and out of engagement with a brake rotor, a power-operated service brake actuator for applying the friction element, locking means acting on the friction element independently of the said actuator and having a first operative condition in which it automatically follows up movement of the friction element and a second operative condition in which it locks the element against movement away from the brake rotor, and a driver-operated control for selecting the first and second operative conditions of the locking means.

Some particular forms of locking means are described in the above-mentioned specification and another is described in the specifications of our copending patent application of even date.

Each of these specific forms of locking means is characterized by a strut of adjustable length and releasable means for locking the parts of the strut together in an extended position.

In some circumstances, the strut may be very heavily loaded while acting to lock the brakes on, as for example when the strut is locked on while the brake drum is in an overheated condition. Subsequent cooling and contraction of the drum causes an additional load to be applied to the brakeshoes, and if this extra load is transmitted back to the strut it may prevent release of the parts when the brake is to be let off.

The present invention is directed to providing a solution to this problem in the case of a vehicle drum brake of the particular known form including a pair of carriers for transmitting actuating forces to the breakshoes though intermediary of thrust members, as described and illustrated in British Pat. No. 972,240.

In accordance with the present invention there is provided an internal shoe drum brake comprising a pair of arcuate brakeshoes, a pair of carriers one associated with each shoe for transmitting actuating forces to the respective shoe through the intermediary of a third member, an hydraulic slave cylinder for power actuation of the carriers, a lock unit comprising a strut of adjustable length arranged to act between the two carriers nd means for selectively locking the strut in an extended position to hold the carriers against retraction, resilient overload means acting in series with the strut to limit shoe retraction forces transmitted back to the strut in the locked condition of the strut, and pivotal lever means coupled to the strut and pivotable by slave of the slace cylinder to relieve the strut of the load imposed on it by the resilient means. While the strut is locked in an extended position.

One carrier may act as the lever, in which case the overload means may be interposed between that carrier and its associated breakshoe.

In another embodiment, a separate lever is provided and the resilient overload means is preferably interposed between the carrier and the strut.

Figure 2:
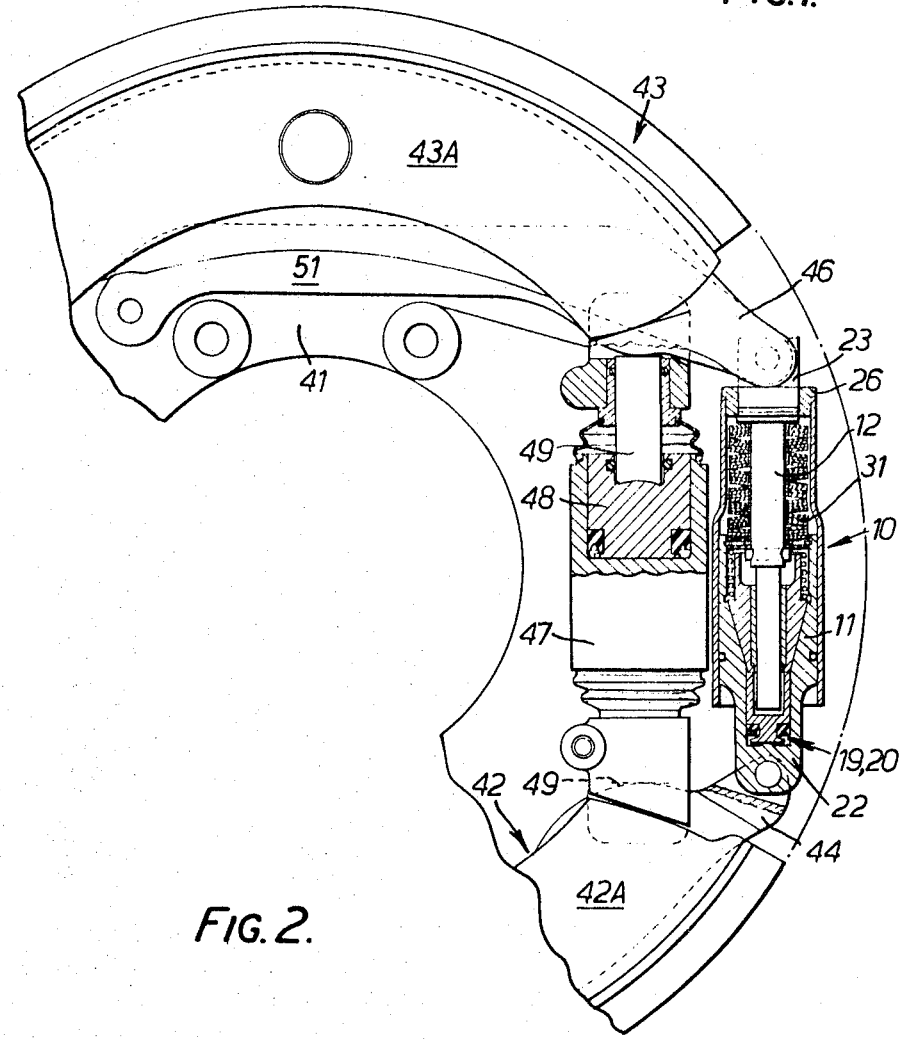
Figure 3:
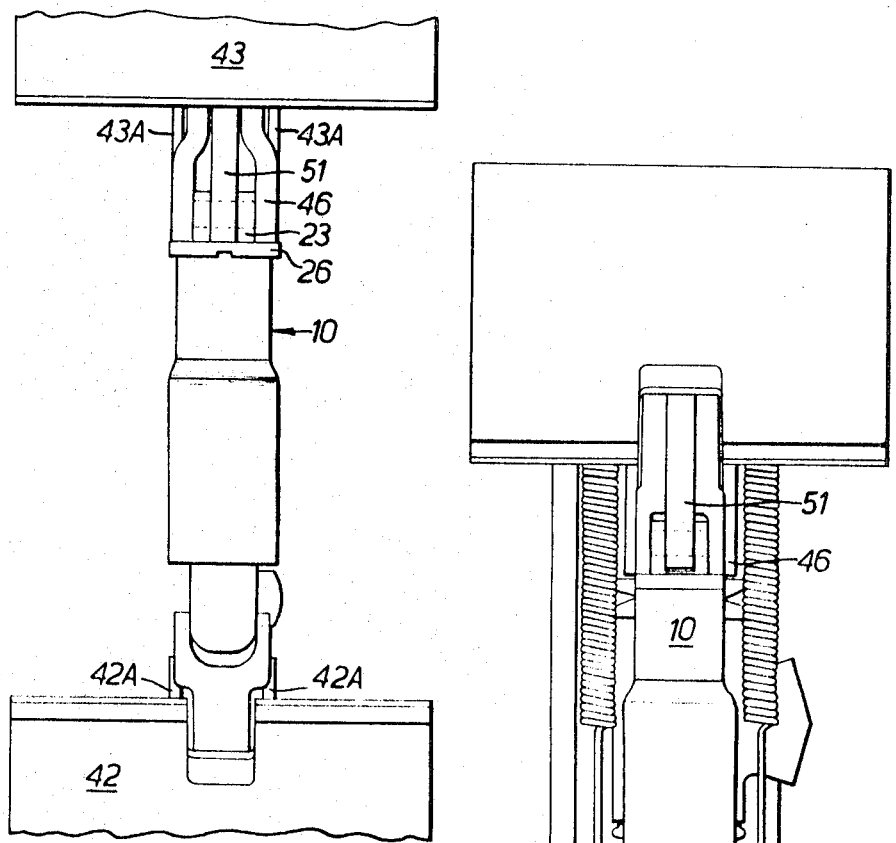
Figure 5:
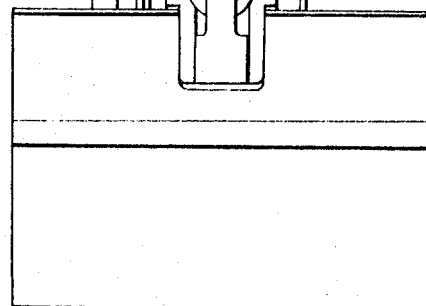
Figure 4:
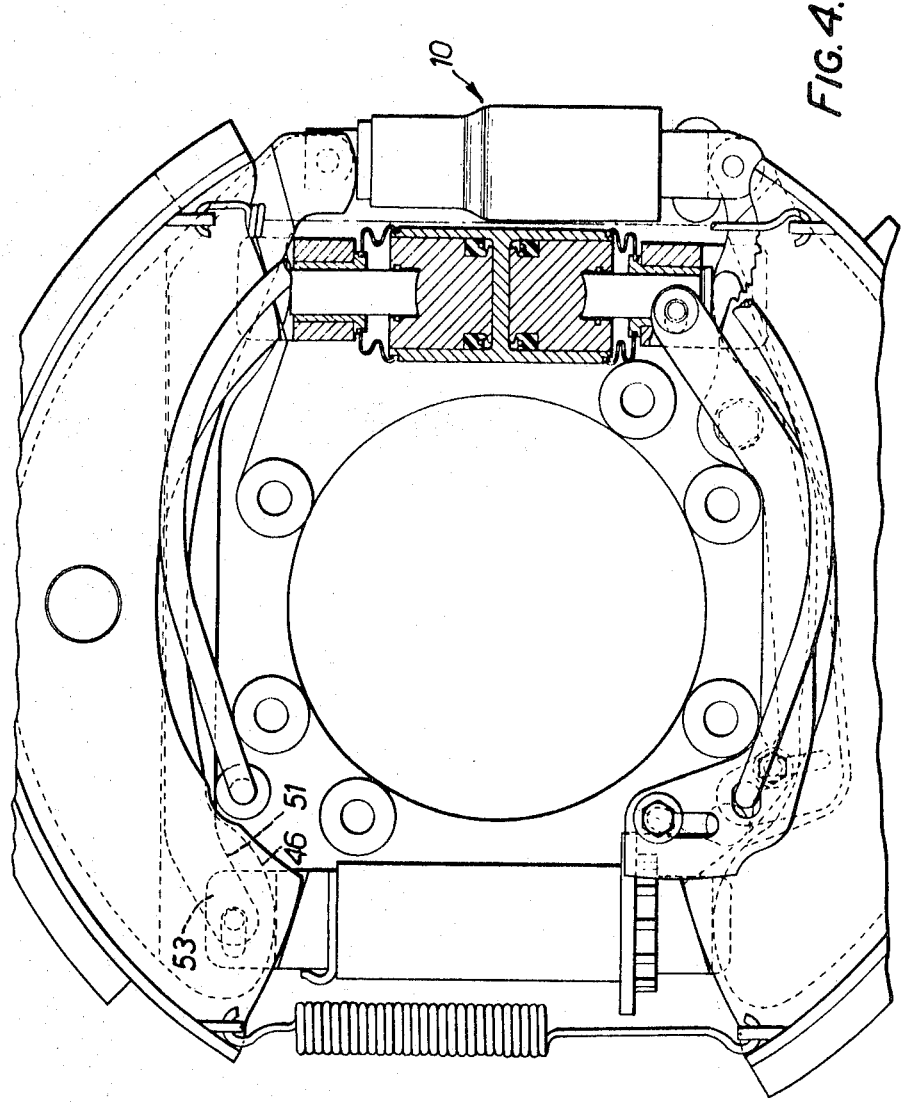

Two particular forms of drum brake in accordance with the invention, will now be described, by way of example only, with reference to the accompanying drawings, in which:

FIG. 1 is an axial cross section of the preferred locking means incorporated in the two brakes;

FIGS. 2 and 3 are a partial sectional and elevation and a side elevation of a drum brake; and FIGS. 4 and 5 are views corresponding to FIGS. 2 and 3 of another form of drum brake.

The locking means shown in FIG. 1 takes the form of a self-contained lock unit 10 comprising a main body part or housing 11 in which is received a shaft 12. The housing and shaft form two relatively movable parts of an adjustable length strut, and between the parts is arranged a collet-type friction clutch comprising a number (preferably three) of wedge-shaped clutch elements 13, each having an internal lining 14 of friction material to secure good frictional engagement with the shaft 12. The outer surfaces of the clutch elements are part conical to cooperate with a frustoconical female clutch face 16 formed in the housing 11. The clutch elements are resiliently biased into frictional locking engagement between the strut parts by coil compression spring 17 working at one end directly on the clutch elements and at the other end against a formed abutment formeb by a collar 18 in the housing 11, Release of the clutch is controlled by means of a fluid pressure actuated motor comprising a piston 19 working in a cylinder 21 formed in the housing. Fluid inlet ports (not shown) enable fluid (hydraulic or pneumatic) to be fed under pressure to the pressure chamber of the cylinder to force the piston outwardly of the cylinder. The distal end of the piston abuts the clutch elements 13, forcing the elements to their disengaged position against the action of the spring 17. Thus, when fluid pressure is supplied to motor 19, 21, the clutch is disengaged to permit free relative axial movement of the strut parts 11 and 12.

The end of the housing 11 adjacent cylinder 21 is formed with a slotted eye-connector 22 or otherwise suitably adapted for thrust transmitting connection to a breake structure, and the further end of shaft 12 is provided with a slotted eye-connector 23. The connector 23 has a sealed, sliding connection with the interior of an end cap 26, to which is secured a tubular dirt shield 27 having sealed sliding engagement over the housing 11.

Mounted loosely on the shaft 12 are two spring abutment collars 28 and 29, between which is arranged a pack of frustoconically dished spring washers (Bellville washers) 31 arranged in groups of four, each group being reversed with respect to its conicity, relative to the adjacent group or groups, The spring washers are preloaded in compression during assembly, the thrusts transmitted to the collars 28 and 29 being taken by the connector end of shaft 12 and a pin 32 through the shaft respectively. The spring washers provide a resilient preload against relative movement in one direction between the end cap 26 and the shaft, but can yield or deflect by flattening under a predetermined minimum load to permit a degree of such relative movement. Other resilient means could, of course, be employed for this purpose, such as a coil or solid rubber spring, but the dished spring washers provide a very compact and economic means of obtaining a required spring rate. Another obvious modification of the lock unit would be to form the housing of separated parts welded or otherwise secured together.

The above-described lock unit 10, which forms the subject matter of our copending patent application of even date, is incorporated in each of the two brakes described below.

The brake of FIGS. 2 and 3 is of the general form described in British Pat. Specification No. 972,240, and comprises a backplate plate 41, a pair of arcuate brakeshoes 42 and 43, each having parallel webs 42A, 43A and a carrier 44, 46 associated with each shoe and arranged to effect actuation thereof through the intermediary of a thrust member, not shown, at the midpoint of the shoe. A service brake actuator comprises a double-ended hydraulic slave cylinder 47, having opposed pistons 48, abutting respective tappets 49, the lower of which, as drawn, abuts the adjacent end of brakeshoe carrier 44. The carrier 44 is pinned to the respective connector 22 of the lock unit, and the carrier 46 abuts the end cap 26 of the lock unit. Pinned to connector 23 is one end of a lever 51, the other end of which is pivotally connected to the backplate 41. Intermediate its ends the lever abuts the adjacent tappet 49.

During normals, service brake actuation, the carrier 44 and shoe 42 are forced outwardly into engagement with the brake drum, and the lever 51 is rotated (anticlockwise in FIG. 2) taking with it the shaft 12 of the lock unit 10, this movement being transmitted by the spring washers 31 to the end cap 26, carrier 46 and breakeshoe 43. The carrier 44 moves in the opposite direction with its breakeshoe, and carries with it the housing 11, This relative movement of the housing and shaft is possible because fluid pressure is constantly supplied to the motor 19, 20 which holds the friction clutch of the lock unit disengaged. However, if the driver wishes to operate the lock unit to act as a parking brake, he applies the brake in the manner described above and then releases the fluid pressure in the lock unit (by manipulation of a control valve) before releasing the service brake actuator.

The lock unit strut is thus locked in its extended position by virtue of engagement of the friction clutch, and resists retraction of the shoes by the action of the brake return springs. The return spring force is transmitted through the carrier 44 to the end cap 26 and through the spring washers 31 to the shaft 12. Thus, the thrust transmitted to the shaft 12 in the "brake-locked" condition is limited to the maximum load which can be transmitted by the spring washers without substantial deflection thereof.

If the lock is operated when the drum is in an overheated condition, subsequent cooling and contraction of the drum will apply an additional force tending to return the shoes inwardly. The pack of spring washers is designed to accommodate this contraction by partial deflection only, i.e., under maximum contraction of the drum the pack of washers is not fully compressed so as to form a solid strut in itself.

Under normal conditions the lock is releasable by operation of the motor 19, 21, but if substantial drum contraction has taken place, the service brake is operated to press lever 51 and shaft 12 outwardly in one direction and the housing 11 in the opposite direction. This causes a further compression of the spring washer 31 and relieves the struts and therefore the clutch of its axial load. The clutch can then be disengaged by the action of motor 19, 21.

Construction and operation of the brake shown in FIGS. 4 and 5 is generally similar to that described above, but in this case, the lever 51 is pivoted not to the backplate but to an adjustable shoe abutment 53 which also forms a fulcrum for the carrier 46, so that the angular movement of the lever and carrier during brake actuation is more nearly identical.

The lever 51 is also effective in relieving the strut of load by operation of the service brake actuation if the lock unit is located radially inside the actuator say at the center of the shoe.

In another modification, not illustrated, the carrier 46 is pinned directly to the shaft connector 23, and the pack of spring washers 31 is omitted from the lock unit 10. Instead, a corresponding resilient overload device comprising a pack of spring washers housed in and acting between a pair of telescopically arranged housing parts is inserted between the carrier 46 and the shoe 43 to transmit all thrusts between the carrier and the shoe. This arrangement avoids the requirement for the separate lever 51. in the brakes-locked condition the carrier 46 is engageable by the service brake actuator to relieve the lock unit 10 of load. In such a case, the carrier 46 acts effectively as the pivoted lever 51 of the illustrated embodiments.

In each case, the maximum braking force that can be applied to the brakeshoes is limited to that which can be transmitted by the spring washers 31, the preload in which is accordingly designed to correspond to a given deceleration value. In the event of an exceptionally heavy braking pressure being developed, as in an emergency stop, the washers can, under course, deflect unser the load applied to them.

In the brakes described above, there is but one brake actuator which acts between one pair of adjacent shoe ends, one pair of abutments (preferably automatically adjustable) between the opposite shoe ends, and on lock unit. If the brake had two actuators an two sets of abutments there would be two lock units.

It will also be understood that the invention is not limited in its scope by the particular form of lock unit described and illustrated herein, which could be replaced by lock units of other constructions, for example as described and illustrated in the complete specification of copending patent application, Ser. No. 873,316 filed Nov. 3, 1969.

I CLAIM:

1. In an internal shoe drum brake comprising a rotary brake drum, a fixed backplate, slave cylinder-actuating means, a pair of arcuate brakeshoes for braking engagement with said brake drum, and a pair of carriers for actuating said respective brakeshoes by transmitting thereto actuating forces from said actuating means, the improvement which comprises:

strut means acting between said carriers and normally free to follow up actuating movements thereof by extension and retraction;

means selectively operable for locking said strut means in an extended condition to hold said carrier and shoes in an applied condition; resilient overload means acting in series with said strut means for limiting shoe retraction forces transmitted to said strut;

and pivoted lever means coupled to said strut and pivotable, by operation of said actuation means, to relieve said strut of load imposed thereon by said resilient overload means.

2. The improved brake of claim 1, wherein said strut means and actuation means are mounted parallel with each other, said strut means being positioned radially outwardly of said actuation means.

3. The improved drum brake of claim 1, wherein the lever means comprises a simple lever having one end pivotally connected to a stationary point and has operative engagement with said actuating means to transmit brake actuating forces from said actuating means to one said carrier through said resilient overload means. essentially a direct direct 4. The improved drum brake of claim 3, wherein said strut means consists esessntially of two strut parts arranged telescopically with respect to each other, one said part having adirect coupling to one carrier, and the other said part having a diect coupling to said lever.

5. The improved brake of claim 3, comprising means pivotally connecting said lever to said backplate.

6. The improved brake of claim 3 comprising an adjustable abutment for an end of one said carrier, and means pivotally mounting said lever on said adjustable abutment.